(12) United States Patent
Michaudet et al.

(10) Patent No.: US 12,106,168 B2
(45) Date of Patent: Oct. 1, 2024

(54) METHOD FOR ELECTROCHEMICAL METALLIZATION OF A DOUBLE-SIDED ELECTRICAL CIRCUIT FOR A SMART CARD AND ELECTRICAL CIRCUIT PRODUCED USING SAID METHOD

(71) Applicant: Linxens Holding, Mantes-la-Jolie (FR)

(72) Inventors: Nicolas Michaudet, Mantes-la-Jolie (FR); Thierry Dumont, Mantes-la-Jolie (FR)

(73) Assignee: Linxens Holdings, Mantes-la-Jolie (FR)

( * ) Notice: Subject to any disclaimer, the term of this patent is extended or adjusted under 35 U.S.C. 154(b) by 0 days.

(21) Appl. No.: 17/926,158

(22) PCT Filed: May 18, 2021

(86) PCT No.: PCT/EP2021/063066
§ 371 (c)(1),
(2) Date: Nov. 18, 2022

(87) PCT Pub. No.: WO2021/233869
PCT Pub. Date: Nov. 25, 2021

(65) Prior Publication Data
US 2023/0196053 A1 Jun. 22, 2023

(30) Foreign Application Priority Data
May 21, 2020 (FR) .................................. FR2005425

(51) Int. Cl.
*G06K 19/06* (2006.01)
*G06K 19/077* (2006.01)

(52) U.S. Cl.
CPC . *G06K 19/07722* (2013.01); *G06K 19/07773* (2013.01)

(58) Field of Classification Search
CPC ....... G06K 19/07749; G06K 19/07769; G06K 19/07722; G06K 19/07747; G06K 19/07745; G06K 19/07773; G06K 19/0772
(Continued)

(56) References Cited

U.S. PATENT DOCUMENTS

2005/0194591 A1* 9/2005 Usami .................. G06K 7/0008
257/E23.064
2007/0152829 A1* 7/2007 Lindsay ........... G06K 19/07345
340/10.2
(Continued)

FOREIGN PATENT DOCUMENTS

FR          3 006 546       12/2014
WO    WO 2014/016332 A1    1/2014
WO    WO 2014/068145 A1    5/2014

*Primary Examiner* — Daniel St. Cyr
(74) *Attorney, Agent, or Firm* — Harrington & Smith

(57) ABSTRACT

Method for the electrochemical metallization of a double-sided electrical circuit for a chip card. Contacts and current leads are located on a front face. An antenna and connection pads are located on a rear face. This method includes an operation of electrochemically depositing at least one layer of electrically conductive material on connection pads, while supplying these connection pads with current via the current leads, contacts and metallized holes establishing electrical continuity between the front face and the rear face. This method furthermore includes, after the operation of electrochemically depositing at least one layer of electrically conductive material, an operation of electrically isolating at least one metallized hole from a connection pad. Electrical circuit obtained using this method.

10 Claims, 6 Drawing Sheets

(58) Field of Classification Search
USPC .................................................. 235/492, 487
See application file for complete search history.

(56) References Cited

U.S. PATENT DOCUMENTS

| | | | | |
|---|---|---|---|---|
| 2013/0140370 A1* | 6/2013 | Finn | ................. | G06K 19/07747 |
| | | | | 29/601 |
| 2014/0284386 A1* | 9/2014 | Finn | ........................ | H01Q 7/06 |
| | | | | 343/866 |
| 2016/0330841 A1* | 11/2016 | Le Loc'h | ......... | G06K 19/07747 |
| 2017/0092612 A1* | 3/2017 | Zenz | .................... | H01Q 1/2208 |
| 2020/0257953 A1* | 8/2020 | Lotya | ............... | G06K 19/07794 |
| 2021/0350198 A1* | 11/2021 | Finn | ................. | G06K 19/07722 |

* cited by examiner

[Fig. 1]
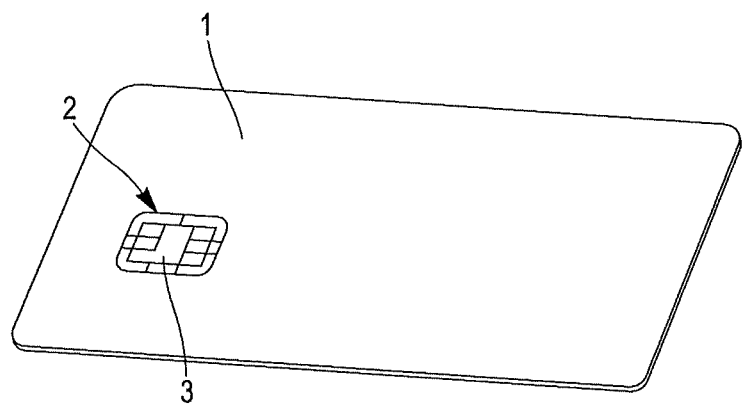
[Fig. 2]
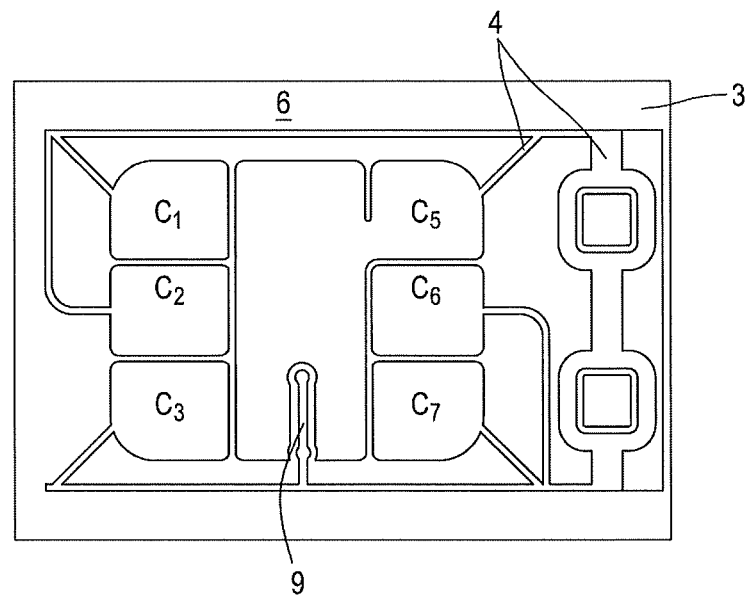

[Fig. 3]
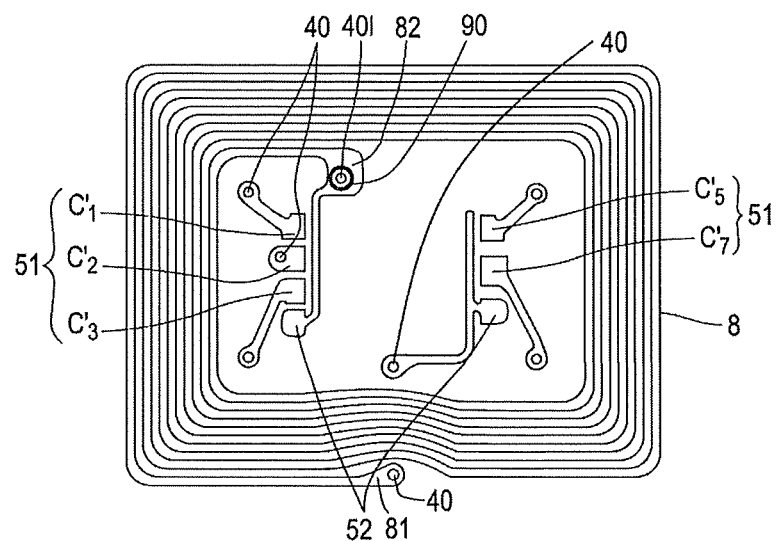
[Fig. 4]
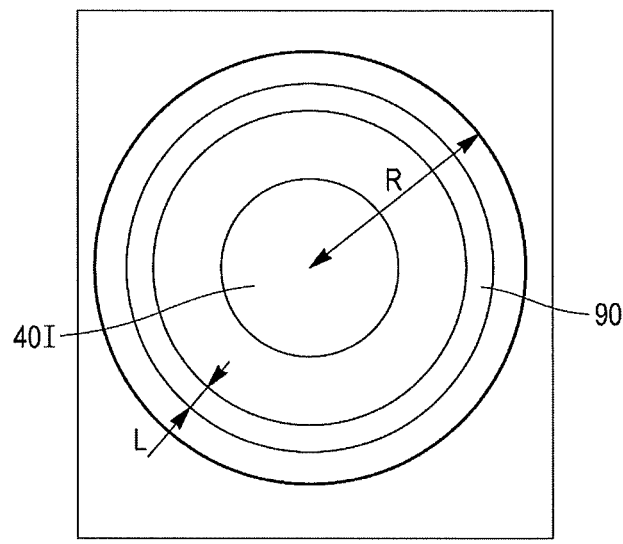

[Fig. 5]
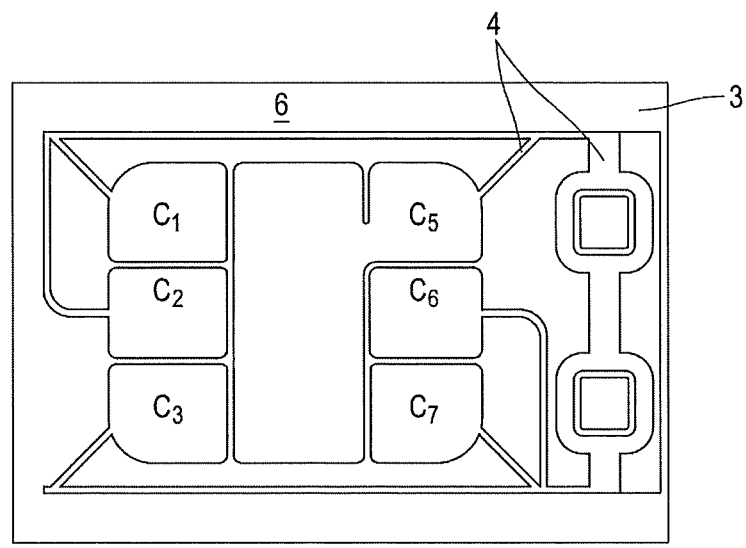
[Fig. 6]
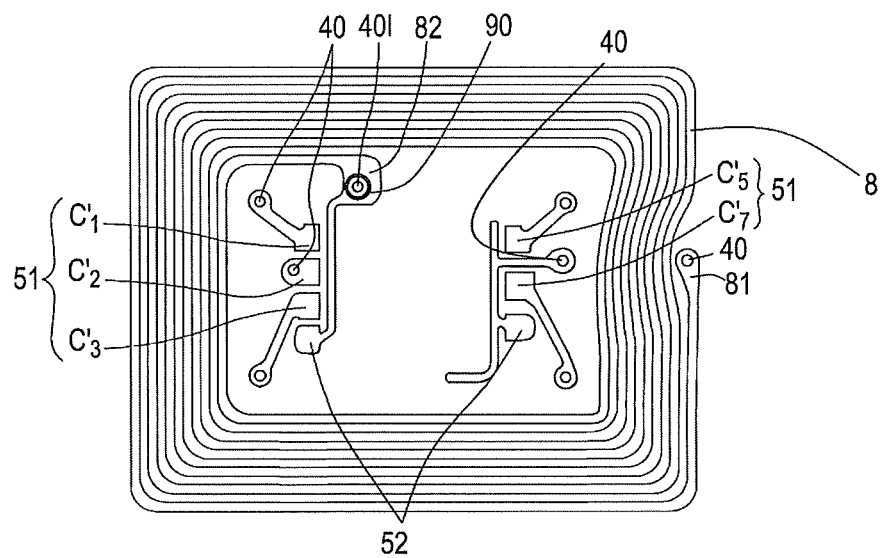

[Fig. 7a]
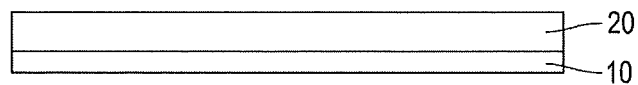
[Fig. 7b]
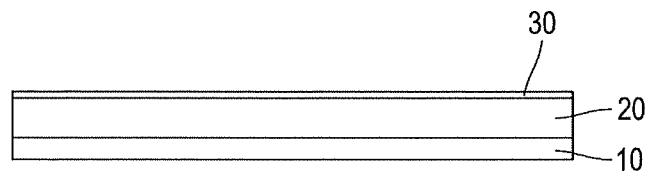
[Fig. 7c]
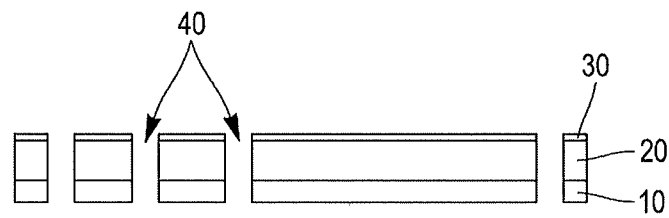
[Fig. 7d]
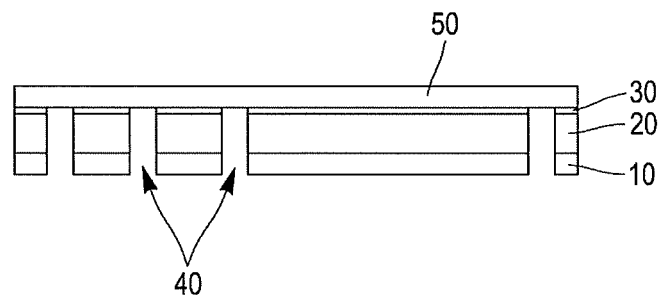

[Fig. 7e]
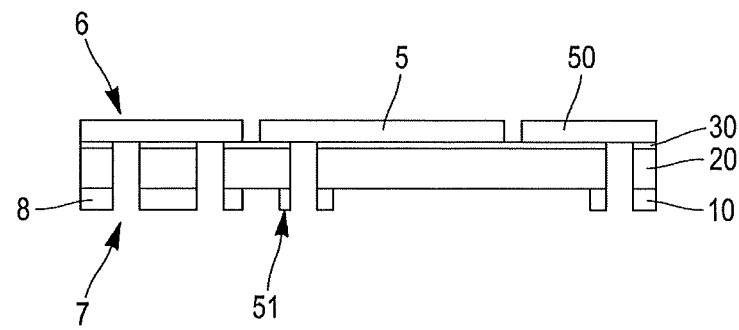
[Fig. 7f]
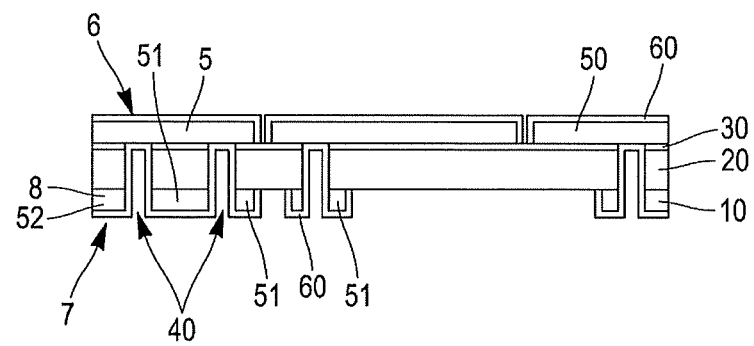
[Fig. 7g]
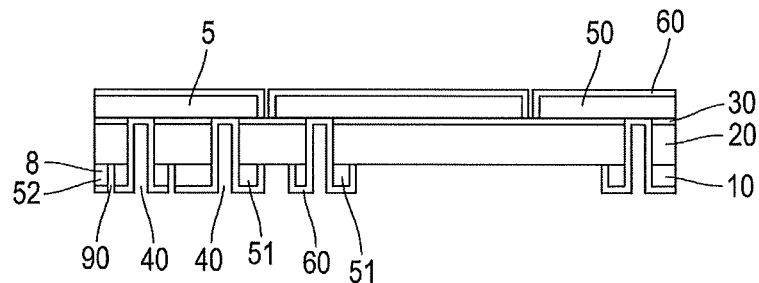

[Fig. 7h]
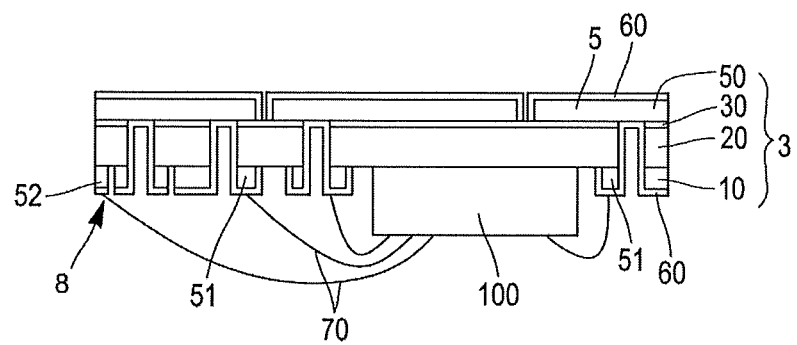

METHOD FOR ELECTROCHEMICAL METALLIZATION OF A DOUBLE-SIDED ELECTRICAL CIRCUIT FOR A SMART CARD AND ELECTRICAL CIRCUIT PRODUCED USING SAID METHOD

CROSS REFERENCE TO RELATED APPLICATION

This patent application is a U.S. National Stage application of International Patent Application Number PCT/EP2021/063066 filed May 18, 2021, which is hereby incorporated by reference in its entirety, and claims priority to FR 2005425 filed May 21, 2020.

TECHNICAL FIELD

The invention relates to the field of chip cards, and more particularly to the field of electronic modules for chip cards.

PRIOR ART

Chip cards have many uses: credit cards, SIM cards for mobile telephones, transport cards, identity cards, etc.

These cards generally consist of a rigid carrier, for example made of plastic, forming most of the card, into which a separately manufactured electronic module is incorporated. This electronic module comprises for example a flexible electrical circuit equipped with an electronic chip (integrated circuit) and means for connecting the chip to a device for reading and/or writing data recorded in the chip.

The invention relates in particular to the field of what are called "dual" cards, that is to say having a dual communication interface with the chip. In other words, these cards allow contact-based or contactless communication. They are also called "Combi" cards.

For "contact-based" use, the contacts are connected to the chip and open out on a face of the module so as to allow an electrical connection to the reading and/or writing device when the card is inserted into this device.

For "contactless" use, there are two types of dual card.

In the first type of card, an antenna arranged in the carrier of the card (also called card body) is electrically connected to the chip. In this case, the chip is able to exchange data with a reading/writing device, either by creating a direct electrical connection between the reading/writing device and the contacts of the module, or by creating direct electromagnetic coupling between the antenna and the reading/writing device.

In the second type of card, a first antenna, called "module antenna", is integrated into the module and allows electromagnetic coupling, through inductive coupling (therefore without an electrical connection), with a second antenna, called "booster or master antenna", incorporated into the abovementioned rigid carrier of the card. The first antenna is smaller than the second antenna. The second antenna may cover a larger surface area on the card than that of the module. This makes it possible to obtain a greater communication range. In this case too, the chip is able to exchange data with a reading/writing device, either by creating a direct electrical connection between the reading/writing device and the contacts of the module, or by creating electromagnetic coupling between the module antenna and the booster antenna, on the one hand, and the booster antenna and the reading/writing device, on the other hand. The antenna of the module thus in fact communicates (with a resonance effect) with a contactless reading and/or writing device by way of the booster antenna. Therefore, the only physical connections in this second type of dual card are located in the module, between the chip and the contacts and between the chip and the module antenna. All of these connections are made on the module. This thus avoids having to make an electrical connection between the antenna incorporated into the card body and the chip incorporated into the module.

Document WO2007026077 discloses modules comprising a flexible electrical circuit with a front face carrying contacts and a rear face carrying the chip and the antenna of the module. Holes (also called "wells" or "vias") are then produced in the electrical circuit, and then the internal wall of these holes is metallized in order to electrically connect the front and rear faces of the module and thus connect the contacts to the chip and to the two ends of the antenna of the module.

In order to facilitate the integration of the module into the card, the antenna should be contained in a module the dimensions of which are defined by the ISO 7816-2 standard. In these dimensions, it is necessary to provide, on the rear face of the module, an area for the placement of the chip, areas for the metallized holes, and an area with connection pads or soldering pads (also called "bonding pads") for the connection of the chip to the contacts and to the antenna. In addition, the turns of the antenna have to be present in a sufficient number, with a certain width and with a minimum distance between the turns in order to obtain the desired electromagnetic characteristics.

Moreover, in order to establish, on the connection pads, reliable soldering with sufficiently low resistance of the connection wires that electrically connect these connection pads to the chip, it is necessary to have one or more metal layers of sufficient thickness on these connection pads. When these metal layers are deposited electrochemically, and the current required for the electrochemical deposition is provided by current leads located on the front face, the connection pads dedicated to connecting the chip to the contacts are supplied with current by way of the contacts and the metallized holes. The connection pads dedicated to connecting the chip to the antenna may for their part also be supplied with power by the front face via the current leads, optionally a conductor track on the front face in the shape of a strap and/or contacts that are not used for connection to a contact-based reading and/or writing device, and at least for one of these by the turns of the antenna. However, when the current required for the electrochemical deposition passes through the turns of the antenna, relatively large inhomogeneities are observed between the thickness of the metal layers electrodeposited on the pads dedicated to connecting the chip to the contacts, on the one hand, and the thickness of the metal layers electrodeposited on the one or more pads dedicated to connecting the chip to the antenna and supplied with power via the turns of the antenna, on the other hand. This also means that, in order to obtain a sufficient thickness of the metal layers electrodeposited thereon, it is necessary to increase the deposition time considerably.

All of these constraints therefore make new module antenna designs very complicated to develop.

Nevertheless, the inventors have found a novel double-sided electrical circuit for a chip card that makes it possible to obtain the electromagnetic performance required for the abovementioned applications, while at the same time improving the method for manufacturing this electrical circuit.

SUMMARY OF THE INVENTION

What is thus proposed is an electrical circuit comprising at least one additional metallized hole and a method in which this additional metallized hole is used during the operations of electrodepositing one or more layers of electrically conductive material on at least one connection pad dedicated to connecting the antenna to the chip, before being electrically isolated from this connection pad.

More specifically, what is proposed is a method for the electrochemical metallization of a double-sided electrical circuit for a chip card with contact-based and contactless communication, wherein provision is made for a flexible dielectric substrate comprising a front face and a rear face. Contacts and current leads electrically connected to at least some of the contacts are arranged on the front face. Connection pads and an antenna are arranged on the rear face. Some of these connection pads are dedicated to connecting a chip to the contacts, and others are dedicated to connecting the chip to the antenna. When implementing this method, at least one layer of electrically conductive material is deposited at least on some of the connection pads, while supplying these connection pads with current via the current leads, contacts and metallized holes establishing electrical continuity between the front face and the rear face.

This method furthermore comprises, after the operation of electrochemically depositing at least one layer of electrically conductive material, an operation of electrically isolating a metallized hole (that is to say at least one of the additional metallized holes mentioned above) from a connection pad, for example a connection pad dedicated to connecting the chip to the antenna.

Thus, by virtue of the additional metallized hole, it is possible to supply current to a connection pad dedicated to connecting the chip to the antenna, directly from the front face and without using the turns of the antenna. However, the use of this additional metallized hole is temporary (during the electrochemical deposition operation). This additional metallized hole is no longer used in the finalized module produced from the electrical circuit obtained using the method according to the invention.

This method also optionally comprises one and/or the other of the following features, each considered independently of one another or in combination with one or more others:

- at least two metallized holes are used, during the operation of electrochemically depositing at least one layer of electrically conductive material, to metallize an internal antenna connection pad and an external antenna connection pad, at least one of these two metallized holes being electrically isolated from the internal and external antenna connection pads in an operation following the operation of electrochemically depositing at least one layer of electrically conductive material;
- one and the same contact on the front face connected to two separate connection pads is used to supply power to these two connection pads during the operation of electrochemically depositing at least one layer of electrically conductive material, by way of two metallized holes, at least one of these two metallized holes then being electrically isolated from each of the connection pads;
- an operation of electrically isolating at least one metallized hole from a connection pad dedicated to connecting the chip to the antenna is implemented using a laser beam;
- the laser beam is moved over the surface of a conductive area connecting the metallized hole to the connection pad dedicated to connecting the chip to the antenna, without leaving this surface, all around this metallized hole in order to isolate this metallized hole from the rest of the connection pad dedicated to connecting the chip to the antenna.

According to another aspect, the invention relates to a double-sided electrical circuit for a chip card with contact-based and contactless communication. This circuit comprises a flexible dielectric substrate, with a front face and a rear face. Contacts and current leads are located on the front face. An antenna and connection pads are located on the rear face. Some of the connection pads are dedicated to connecting a chip to the contacts, and others are dedicated to connecting the chip to the antenna. This circuit furthermore comprises at least one contact that closes off at least two metallized holes. One of these metallized holes is connected to a contact connection pad dedicated to connecting the chip to this contact. The other of these metallized holes is electrically isolated from an antenna connection pad dedicated to connecting the chip to the antenna. It is not used for electrical conduction during operational use of the electrical circuit in a module.

This electrical circuit also optionally comprises one and/or the other of the following features, each considered independently of one another or in combination with one or more others:

- an external connection pad of the antenna is electrically connected to the antenna by way of two metallized holes that are closed off by a conductor track located on the front face;
- an external connection pad of the antenna is electrically connected to the antenna by way of a contact;
- the antenna forms at least one loop around a central area corresponding to an area for the fastening of the chip, and all of the contact connection pads and antenna connection pads are located around this central area, within a loop of the antenna; and
- at least one metallized hole electrically isolated from all of the connection pads is surrounded by an isolating area resulting from abrasion produced by a laser beam.

BRIEF DESCRIPTION OF THE DRAWINGS

Further features, aims and advantages of the invention will become apparent from reading the following detailed description, and with reference to the appended drawings, which are given by way of non-limiting examples and in which:

FIG. 1 schematically shows, in perspective, a chip card comprising one example of a module according to the invention;

FIG. 2 schematically shows, in an elevated view from above, an electrical circuit portion corresponding to the front face, or contact face, of a module for a chip card such as that from FIG. 1;

FIG. 3 schematically shows, in an elevated view from below, the electrical circuit portion shown in FIG. 2, this FIG. 3 corresponding to the rear face, or soldering face ("bonding face"), of the module;

FIG. 4 schematically shows, in an elevated view from above, a variant of the electrical circuit portion shown in FIG. 2;

FIG. 5 schematically shows, in an elevated view from below, the electrical circuit portion shown in FIG. 4;

FIG. 6 schematically shows a detail of a metallized hole electrically isolated by way of an isolating area resulting from abrasion produced by a laser beam; and FIG. 7: FIGS. 7a to 7h schematically show a sectional view of various steps of one exemplary mode of implementation of the method according to the invention.

DETAILED DESCRIPTION

One exemplary embodiment of an electrical circuit according to the invention is described below.

As shown in FIG. 1, a chip card 1 with contact-based and contactless communication comprises a module 2. A module 2 comprises in particular an electrical circuit 3 and a chip 100 (not visible in FIG. 1). The module 2 is produced in the form of a separate element that is inserted into a cavity formed in the body of the card 1. A booster antenna (not shown) is integrated into the body of the card 1 in a known manner.

The electrical circuit 3 comprises multiple contacts 5 to which the chip 100 is connected (see FIG. 7h). The electrical circuit 3 is shown in FIG. 2, from its front face 6 (contact face). It is also shown in FIG. 3 from its rear face 7 (bonding face). The electrical circuit 3 shown in FIGS. 2 and 3 corresponds to a double-sided printed circuit board for a "dual" card, with contacts 5 on the front face 6 and an antenna 8 on the rear face 7. In fact, the figures show only a portion of the electrical circuit. This portion corresponds essentially to that needed to produce a module 2. Multiple similar portions may be carried by one and the same flexible substrate, for example in order to implement the method according to the invention in reel-to-reel or roll-to-roll mode.

There are for example six contacts 5: C1, C2, C3, C5, C6 and C7. The contact C1 is used for connection to the positive power-on terminal of the chip 100. The contact C2 is used for connection to the reset terminal of the chip 100. The contact C3 is used for connection to the clock signal terminal of the chip 100. The contact C5 is used for connection to the grounding terminal of the chip 100. The contact C6 is not connected directly to the chip 100 in the applications targeted by the invention. The contact C7 is used for connection to the input/output terminal of the chip 100.

In a finalized module 2, each of the contacts C1, C2, C3, C5 and C7 is therefore connected respectively to a terminal of the chip 100, by way of a metallized hole 40, of a contact connection pad 51 (that is to say dedicated to connecting a contact to the chip) and by an electrically conductive wire 70 connecting a contact connection pad 51 to a terminal of the chip 100 (see FIG. 7h). FIG. 3 uses C'1, C'2, C'3, C'S and C'7 to denote the connection pads 51 each respectively connected to a contact 5 (respectively C1, C2, C3, C5 or C7) by way of a metallized hole 40. FIGS. 2 and 3 are not on the same scale. It will be understood that the surface area taken up by the antenna 8 is essentially less than or equal to that taken up by the contacts 5. FIG. 3 is in fact shown as a mirror image (what is on the right in FIG. 3 corresponds to what is on the left in FIG. 2, and should therefore be on the left, and vice versa) of the real configuration in order to facilitate the identification of the contact connection pads 51 (C'1, C'2, C'3, C'S and C'7) with respect to the contacts 5 (C1, C2, C3, C5 and C7) as shown in FIG. 2. These metallized holes 40 are thus used at the same time to connect, in the finalized module 2, a contact 5 to a contact connection pad 51 and to a terminal of the chip 100, but they are also used during the one or more operations of electrochemical metallization in order to make it possible to deposit one or more layers of electrically conductive material 60 (for example nickel or gold) on these contact connection pads 51.

The chip should also be connected to each of the two ends of the antenna 8. To this end, two, internal and external, antenna connection pads 52 (that is to say dedicated to connecting the antenna 8 to the chip 100) are provided on the rear face 7. The antenna 8 comprises multiple turns wound around a central area corresponding to an area for the fastening of the chip 100. Advantageously, all of the contact connection pads 51 and antenna connection pads 52 are located around this central area, within the turns of the antenna 8.

In order to be able to electrochemically carry out an operation of metallizing these internal and external antenna connection pads 52, these have to be connected to the current leads 4 arranged on the front face 6. The current leads 4 are conductor tracks that make it possible to establish an electrical connection between an electrode of an electrodeposition cell and the contacts 5. The external antenna connection pad 52 is connected to the external end 81 of the antenna 8 via two metallized holes 40 and a conductor track 9 that connects these two metallized holes 40 on the front face 6.

This conductor track 9 is of course itself connected to a current lead 4. This conductor track 9 is present in the embodiment described with reference to FIGS. 2 and 3, but may be removed and replaced with a contact 5 or a portion of a contact 5 according to other embodiments. The internal antenna connection pad 52 is connected to the internal end 82 of the antenna 8 and to the contact C5 by a metallized hole 40I (in FIG. 3, this metallized hole 40I is shown as already being electrically isolated from the internal antenna connection pad 52, but during the metallization phase, it is indeed connected thereto). However, since this contact C5 is used in the finalized module 2 for grounding, after the metallization operation, this metallized hole 40I is electrically isolated from the internal antenna connection pad 52, for example by using a laser beam to clear an isolating ring 90 on the rear face 7 around this metallized hole 40I. A magnification of this region comprising the metallized hole 40I is shown in FIG. 4. As may be seen in FIGS. 3 and 4, the laser beam has been moved over the surface of a conductive area connecting the metallized hole 40I to the internal antenna connection pad 52, without leaving this surface, all around this metallized hole 40I. For example, the width L of the isolating region 90 resulting from the abrasion of the conductive layers produced by a laser beam is 17 micrometres. Thus, for reasons of precision, tolerance and ease of setting of the parameters of the laser beam, it is preferable to have an area covered by conductive layers over a radius R of at least 200 micrometres starting from the centre of the metallized hole 40I.

According to one variant illustrated by FIGS. 5 and 6, the contact C5 is used for the metallization of the connection pad C'5, and the contact C6, not used in the finished and functional module, is used for the metallization of the connection pad 52 connected to the external end 81 of the antenna 8. The external end 81 of the antenna 8 is connected to the contact C6 by a first metallized hole 40, and is then connected to the connection pad 52 by a second metallized hole connecting the contact C6 to the connection pad 52. It is thus possible to dispense with the conductor track 9 on the front face 6.

FIGS. 7a to 7h schematically illustrate various steps of an exemplary method according to the invention for manufacturing the electrical circuit 3, this method being implemented in reel-to-reel or roll-to-roll mode.

As shown in FIG. 7a, provision is made for a structure comprising a first sheet of electrically conductive material 10 laminated onto a substrate of electrically insulating material 20. This structure (also called a "clad") may be obtained by directly laminating together the first sheet of electrically conductive material 10 and the substrate of electrically insulating material 20. As an alternative, a layer of adhesive material, not shown, may be coated or laminated onto the first sheet of electrically conductive material 10 and/or the substrate of electrically insulating material 20, before laminating them together with the layer of adhesive material between the two of them.

The first sheet of electrically conductive material 10 may be formed of a metal such as copper, steel, aluminium or an alloy of these metals. The first sheet of electrically conductive material 10 has a thickness for example of 18 micrometres or 25 micrometres. The substrate of electrically insulating material 20 is formed of a dielectric material, for example a composite (glass-epoxy) material or a plastic (PET, PEN, polyimide, etc.) material. The substrate of electrically insulating material 20 is generally thin (its thickness is for example of the order of 100 micrometres) in order to retain a flexibility that is compatible with reel-to-reel or roll-to-roll methods for manufacturing electronic modules 3. The assembly consisting of the substrate of electrically insulating material 20 covered by the first sheet of electrically conductive material 10 also forms a flexible circuit that is compatible with reel-to-reel or roll-to-roll methods for manufacturing electronic modules 3.

In the following step, illustrated by FIG. 7b, a film or a layer of adhesive material 30 is applied to the face of the substrate of electrically insulating material 20 opposite the one on which the first sheet of electrically conductive material 10 is located.

In the following step, illustrated by FIG. 7c, holes 40, 40I are perforated through the whole structure obtained in the previous step. For example, the holes 40, 40I are perforated by punching in a direction essentially perpendicular to the plane of this structure.

In the following step, illustrated by FIG. 7d, a second sheet of electrically conductive material 50 is laminated, onto the layer of adhesive material 30, on the face of the substrate of electrically insulating material 20 opposite the one on which the first sheet of electrically conductive material 10 is located. The bottom of these holes 40, 40I is closed off by the second sheet of electrically conductive material 50. The holes 40, 40I then become blind holes, also called connection wells (as explained below, these holes 40, 40I are metallized in a subsequent step in order to make them electrically conductive).

The second sheet of electrically conductive material 50 may be formed of a metal such as copper, steel, aluminium or an alloy of these metals. The second sheet of electrically conductive material 50 has a thickness for example of 18, 25 or 35 micrometres.

In the following step, illustrated by FIG. 7e, patterns are formed in a known manner, through photolithography, in each of the first 10 and second 50 sheets of electrically conductive material. On the front face 6, that is to say in the second sheet of electrically conductive material 50, these patterns comprise contacts 5 and current leads 4 (not visible in FIG. 7e). On the rear face 7, that is to say in the first sheet of electrically conductive material 10, these patterns mainly comprise contact connection pads 51 and antenna connection pads 51, and also an antenna 8.

In the following step, illustrated by FIG. 7f, one or more layers of electrically conductive material 60 are deposited electrochemically on at least the contacts 5, on the connection pads 51, 52 and in the holes 40. Part of this step (for example the step for making the holes conductive) may have been carried out previously. The one or more layers of electrically conductive material 60 may comprise one or more metals from the following list: nickel, gold, palladium, silver and/or alloys thereof. Masks are optionally used to selectively deposit some of these electrically conductive materials on some areas and not on others, or else with larger or smaller thicknesses depending on the areas and/or the electrically conductive material that is deposited. The electrochemical deposition of this or these layer or layers of electrically conductive material 60 is important so as then to be able to reliably solder, to the connection pads 51, 52, electrically conductive wires 70 electrically connecting the chip 100 to the connection pads 51, 52. The electrochemical deposition of this or these layer or layers of electrically conductive material 60 on the rear face 7 is made possible by the flow of current, via the metallized holes 40, 40I, between the current leads 4 and the contacts 5 located on the front face 6 and the connection pads 51, 52, the antenna 8 and any other tracks located on the rear face 7. It may be noted that, at this stage, some contacts 5 (for example on the right in FIG. 7f) are electrically connected to just one metallized hole 40 and essentially to a connection pad 51, while at least one other (on the left in FIG. 7f) is electrically connected to two metallized holes 40 and essentially to a contact connection pad 51 and an antenna connection pad 51. For this contact 5 connected to two metallized holes 40, the two metallized holes 40 and the two connection pads 51, 52 are therefore short-circuited at least by the front face 6.

The following step, illustrated by FIG. 7g, consists essentially in de-short-circuiting at least some metallized holes 40 and the connection pads 51, 52 that are electrically connected to one another. The isolation (de-short-circuiting) takes place in particular for the holes that it is essential to isolate. This may advantageously be performed using a laser beam. Advantageously, a ring 90 is produced in the one or more layers of electrically conductive material 60, and also in the first sheet of electrically conductive material 10. The laser beam thus makes it possible to expose the substrate of electrically insulating material 20, that is to say to remove, at this ring, the one or more layers of electrically conductive material 60, and also the first sheet of electrically conductive material 10. Of course, other shapes may be produced using the laser beam, but preference will be given to a closed shape that corresponds to a movement of the beam over a material the structure of which is homogeneous. Indeed, moving the laser beam so as to pass from an area in which the substrate of electrically insulating material 10 is in the exposed state, to an area covered by the one or more layers of electrically conductive material 60, and the first sheet of electrically conductive material 10, requires setting the laser beam parameters appropriately for each of these areas, which, although not impossible, requires a great deal of precision. By contrast, setting the laser beam is easier to control when clearing, from the substrate of electrically insulating material 20, a stack of identical layers over the entire travel of the laser beam.

As an alternative, this de-short-circuiting step illustrated by FIG. 7g may be carried out by photolithography, for example by implementing steps such as applying a film resistant to electrodeposition ("plating resist"), insolating and developing the film, before metallization and etching.

Once the de-short-circuiting step has been carried out, other steps may be implemented. For example, as illustrated by FIG. 7h, a chip 100 is attached to the rear face 7 of the substrate of electrically insulating material 20. Next, conductive wires 70 may be connected to the chip 100, on the one hand, and to the connection pads 51, 52, on the other hand.

Other known steps, not shown, may then be implemented. For example, encapsulating the connection wires 70 and the chip 100 in a resin, slicing the electrical circuit 3 in order to obtain individualized modules 2 and integrating the individualized modules 2 into a cavity milled out of a card 1.

Since the operation of electrochemically depositing one or more layers of conductive material 60 on the antenna connection pads 52 is no longer dependent on the current flowing through the antenna 8, it is possible to produce thinner antenna turns and therefore to create more turns. The turns may also be tightened.

Likewise, during the operation of electrochemically depositing one or more layers of conductive material 60, with the antenna 8 being able to be connected, at each of its ends, to the front face 6 via a metallized hole 40, a better distribution of the deposition of this or these layer or layers of conductive material 60 is obtained. This makes it possible to reduce the inductance of the antenna 8 and thus improve its radiofrequency performance.

The invention claimed is:

1. A method for the electrochemical metallization of a double-sided electrical circuit for a chip card with contact-based and contactless communication, the method comprising:
   providing a flexible dielectric substrate, where the flexible dielectric substrate comprises a front face and a rear face, where the front face comprises a plurality of contacts and a plurality of current leads thereon, where the plurality of current leads are electrically connected to at least two of the plurality of contacts, where the rear face comprises an antenna and a plurality of connection pads thereon, where at least two of the plurality of connection pads are dedicated to connecting a chip to the plurality of contacts, and at least one different connection pad of the plurality of connection pads is dedicated to connecting the chip to the antenna,
   electrochemically depositing at least one layer of electrically conductive material on the plurality of the connection pads, while supplying the plurality of connection pads with current via the plurality of current leads, where the plurality of contacts and metallized holes establish electrical continuity between the front face and the rear face,
   after the electrochemically depositing of the at least one layer of electrically conductive material, electrically isolating at least one of the metallized holes from one of the plurality of connection pads which is dedicated to connecting the chip to the antenna.

2. The method according to claim 1, wherein at least two of the metallized holes are used, during the electrochemically depositing at least one layer of electrically conductive material, to metallize an internal antenna connection pad of the plurality of connection pads and an external antenna connection pad of the plurality of connection pads, where at least one of the at least two metallized holes is electrically isolated from the internal and external antenna connection pads in an operation following the electrochemically depositing of the at least one layer of electrically conductive material.

3. The method according to claim 1, wherein a first one of the plurality of contacts on the front face is connected to two separate ones of the plurality of connection pads, where the first contact is used to supply power to the two connection pads during the electrochemically depositing of the at least one layer of electrically conductive material, with use of two of the metallized holes, where at least one of the two metallized holes is then subsequently electrically isolated from each of the two connection pads.

4. The method according to claim 1, further comprising electrically isolating, using a laser beam, at least one of the metallized holes from one of the plurality of connection pads which is dedicated to connecting the chip to the antenna.

5. The method according to claim 4, wherein the laser beam is moved over a surface of a conductive area connecting the at least one metallized hole to the connection pad dedicated to connecting the chip to the antenna, without leaving the surface around the at least one metallized hole in order to isolate the at least one metallized hole from a rest of the connection pad dedicated to connecting the chip to the antenna.

6. A double-sided electrical circuit for a chip card with contact-based and contactless communication, comprising:
   a flexible dielectric substrate, where the flexible dielectric substrate comprises a front face and a rear face,
   a plurality of contacts and a plurality of current leads located on the front face,
   an antenna and plurality of connection pads located on the rear face,
   where at least two first ones of the plurality of connection pads are dedicated to connecting a chip to the plurality of contacts, and second ones of the plurality of connection pads are dedicated to connecting the chip to the antenna,
   where at least one of the plurality of contacts is located on the front face, where the at least one contact closes off at least two metallized holes, where the at least two metalized holes extend through the flexible dielectric substrate, where a first one of the metallized holes is connected to a contact connection pad of the first connection pads which are dedicated to connecting the chip to the at least one contact, and where a second one of the metallized holes is electrically isolated from an antenna connection pad of the second connection pads which are dedicated to connecting the chip to the antenna.

7. The double-sided electrical circuit according to claim 6, wherein an external antenna connection pad of the plurality of connection pads is electrically connected to the antenna with two second ones of the metallized holes, where the two second metallized holes are closed off by a conductor track located on the front face.

8. The double-sided electrical circuit according to claim 6, wherein an external antenna connection pad of the plurality of connection pads is electrically connected to the antenna with one of the plurality of contacts.

9. The double-sided electrical circuit according to claim 6, wherein the antenna forms at least one loop around a central area corresponding to an area for fastening of the chip, where the plurality of connection pads comprise contact connection pads and antenna connection pads, and wherein all of the contact connection pads and antenna connection pads are located around the central area within a loop of the antenna.

10. The double-sided electrical circuit according to claim 6, comprising a further metallized hole which extends through the flexible dielectric substrate, where the further metallised hole is electrically isolated from all of the plurality of connection pads, where the further metallized hole is surrounded by an isolating region resulting from abrasion produced by a laser beam.

* * * * *